United States Patent [19]
Fletcher et al.

[11] 3,945,879
[45] Mar. 23, 1976

[54] APPARATUS FOR POSITIONING MODULAR COMPONENTS ON A VERTICAL OR OVERHEAD SURFACE

[76] Inventors: James C. Fletcher, Administrator of the National Aeronautics and Space Administration, with respect to an invention of Cyrus C. Haynie, Newport Beach; Samuel V. Messineo, Hawthorne, both of Calif.

[22] Filed: Aug. 30, 1974

[21] Appl. No.: 502,137

[52] U.S. Cl................. 156/556; 33/1 G; 33/174 B; 156/286; 156/382; 248/362; 248/363; 269/21
[51] Int. Cl.²........................................ B32B 31/00
[58] Field of Search........................... 156/285–287, 156/381, 382, 71, 63, 378, 379, 556; 248/363, 362; 51/235; 33/1 G, 174 B, 174 G; 269/21, 22, 35

[56] References Cited
UNITED STATES PATENTS

| | | | |
|---|---|---|---|
| 2,713,210 | 7/1955 | Lobachewski | 33/174 G |
| 2,983,305 | 5/1961 | Scher et al. | 156/286 |
| 2,983,638 | 5/1961 | Quehl, Jr. | 269/21 |
| 3,520,055 | 7/1970 | Sannett | 269/21 |
| 3,666,582 | 5/1972 | Kauffman et al. | 156/63 |

Primary Examiner—Edward G. Whitby
Attorney, Agent, or Firm—Howard J. Osborn; John R. Manning

[57] ABSTRACT

An apparatus is disclosed for holding a plurality of modular components against a surface. A fixture prepositions the components and a vacuum develops a uniform pressure which presses and holds the fixture and objects against a surface. The surface may be curved, vertical, or overhead and since local load concentrations are avoided, fragile ceramic tiles may be installed using the apparatus.

6 Claims, 2 Drawing Figures

APPARATUS FOR POSITIONING MODULAR COMPONENTS ON A VERTICAL OR OVERHEAD SURFACE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to an apparatus for positioning and holding a plurality of modular components, or the like, in a predetermined configuration while they are being attached directly to a surface which may be curved, vertical, or overhead.

2. Description of the Prior Art.

The advantages of covering a surface with prefabricated modular components having desired characteristics are well known. For example, this technique is widely used in the construction industry for finishing walls, ceilings, and floors of basements, offices, and the like with modular components giving a desired decorative effect. The technique is also used in the aerospace industry where modular panels having desired thermal characteristics are attached to the outer surfaces of spacecraft.

However, these construction techniques become cumbersome if each component must be individually positioned by laborers. The problems associated with piecemeal fitting of modular components become particularly burdensome if the surface to which the components are to be attached is curved, vertical, or overhead.

While earlier developments include installing a plurality of modular components, these earlier developments lacked the aspects of this invention whereby a plurality of objects can be attached directly to a curved, vertical, or overhead surface.

An application showing the use of a lattice for positioning and maintaining a plurality of floor tiles in a predetermined configuration is described in U.S. Pat. No. 2,852,932 to Cable. However, this relates to flat, downhand surfaces and not to curved, vertical, or overhead surfaces. Additionally, the lattice used in the Cable patent is attached to the surface along with the tiles. United States Pat. No. 3,721,050 to Perina teaches a system whereby a frame system is attached to a flat vertical or flat overhead surface and modular panels are then connected to the frame members. Other prior art generally relating to the field of the invention includes: U.S. Pat. No. 3,254,417 to Carmichael relating to a tile setting template which is used to position tiles on a flat, downhand surface. U.S. Pat. 3,287,814 to Littman teaches a device for mounting data sheets on a larger mounting sheet and does not relate to overhead, contoured, or vertical surfaces.

It is the purpose of the present invention to disclose an apparatus for positioning and maintaining a plurality of objects in a preselected configuration against a surface which may be curved, vertical, or overhead. It is furthermore an aspect of the present invention that a vacuum is used to apply a uniform pressure to the objects to hold them in place against the surface while they are being attached. An additional aspect of the present invention is that the use of a uniform pressure prevents local stress concentrations in the objects being attached; therefore, fragile tiles can be installed without being cracked. Another aspect of the present invention is that the position and alinement of the objects may be inspected after the objects are in position against the surface but before they are attached to the surface.

These and other advantages of the invention are set forth in the following specification and claims considered in connection with the attached drawings to which they relate.

SUMMARY OF THE INVENTION

The present invention comprises a fixture which may be manufactured in appropriate standard dimensions or any other dimensions which are either convenient or appropriate. The objects which are to be attached to the surface are located and held in place on the fixture by any suitable means such as raised projections bordering the objects. By appropriate arrangement of the projections a plurality of objects can be alined, quickly and efficiently, in a predetermined configuration on the fixture. The fixture and properly alined objects are moved into position adjacent to the portion of the surface to which the objects are to be attached and a uniform pressure applied to the fixture and objects holding them in place against the surface until the objects have been attached. A feature of the present invention is that the surface need not be flat but may be curved. To assure proper alinement of the objects on a curved surface the fixture is made to mate with the contours of this surface and may be manufactured from a flexible material which will conform to the varying contours of different surfaces. Thus, the same fixture may be used to aline objects on surfaces having a variety of contours resulting in ease and economy of installation.

The fixture may be provided with a plurality of apertures exposing the centers of and seams between the objects so that the alinement and positioning of the objects may be inspected through these apertures by touch as well as by sight. If only visual inspection is required, the fixture may be manufactured from a transparent material. This aspect of the invention provides a simple means for assuring proper alinement and positioning of the objects in three directions prior to attachment of the objects to the surface.

A number of means for attaching the objects to the surface will suggest themselves to one skilled in the art. In the preferred embodiment, it is intended that a pressure sensitive adhesive be used to bond the objects to the surface; however, any other suitable means such as mechanical fasteners or diffusion bonding may be used.

The uniform pressure which holds the fixture and properly alined objects against the surface until the objects have been attached is created by sealing the fixture and objects in a cavity formed between a flexible material impervious to air and the surface to which the objects are to be attached, and then pumping the air from this cavity. The air pressure outside the cavity forces the objects and fixture against the surface and holds them in position irrespective of the orientation of the surface. Therefore, the objects may be attached to overhead or vertical as well as downhand surfaces with ease and speed.

Another advantage of using a vacuum means, of the type described, to hold the objects and fixture in position against the surface is that the pressure distribution is uniform over the entire fixture, which being flexible, will be forced to conform to the contour of the surface. The uniform pressure distribution and flexible fixture assure an even distribution of the load to the objects; therefore, fragile ceramic tiles may be installed without cracking caused by local load concentrations.

It will be seen from the following description that the invention will permit a wide variety of objects to be installed on surfaces without regard to the surfaces' shape or orientation. In particular, it will be seen that the present invention will permit fragile ceramic tile to be installed on curved, vertical, or overhead surfaces.

DESCRIPTION OF THE PREFERRED EMBODIMENT

Figure 1:
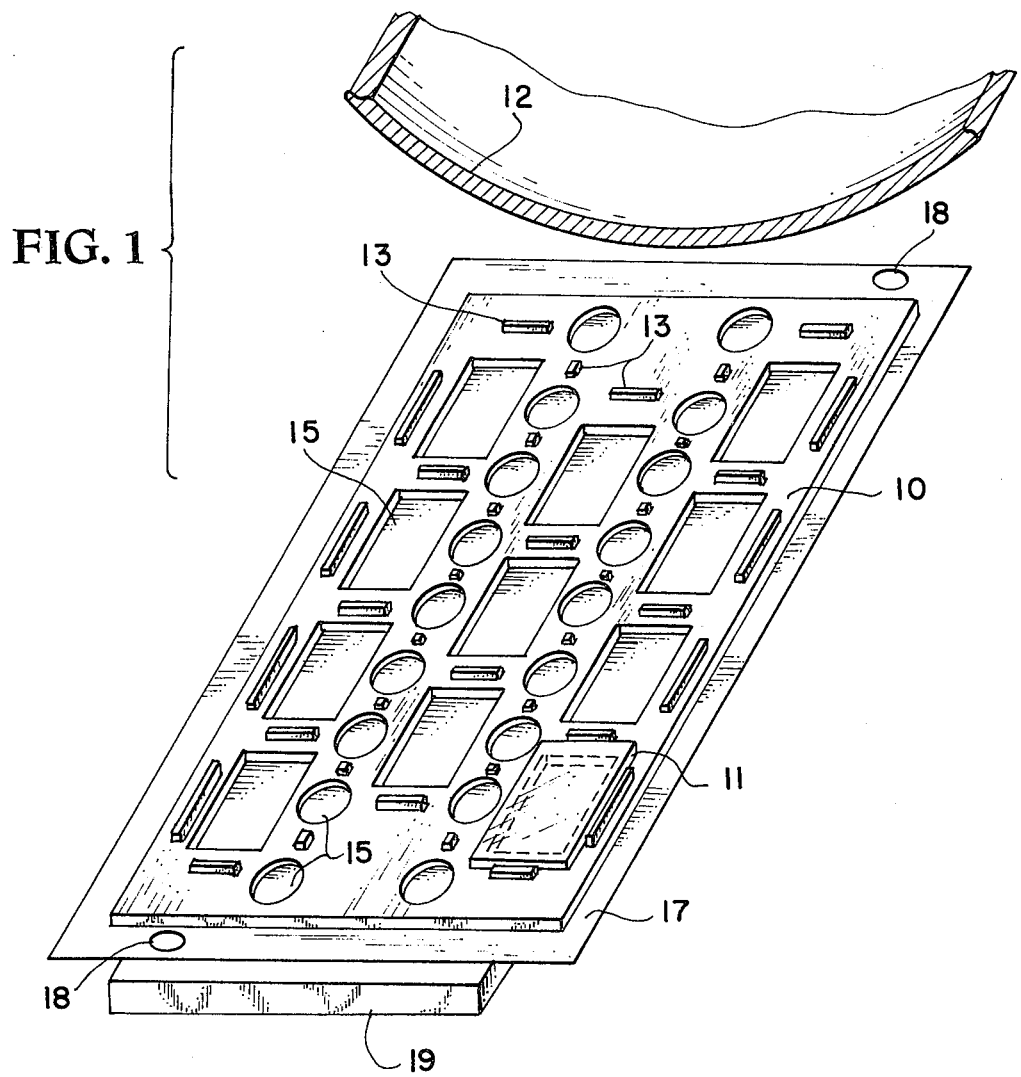
FIG. 1 is a perspective view of the present invention.
Figure 2:
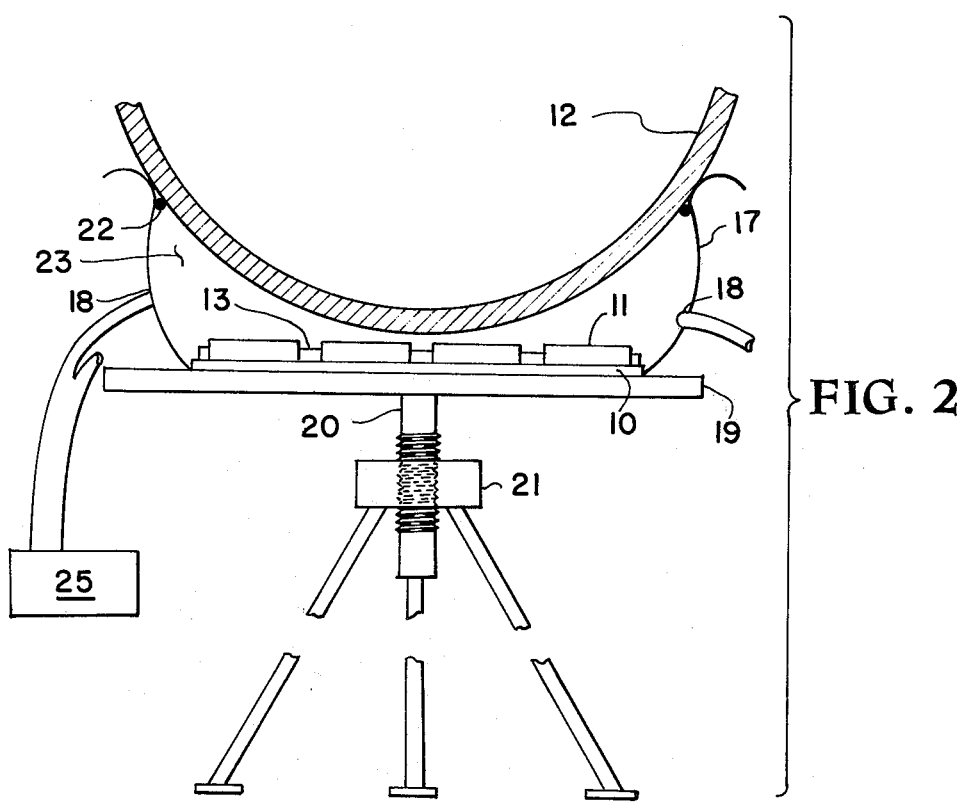
FIG. 2 is a side elevational view of the present invention in place beneath an overhead surface.

Referring now to the drawings, there is illustrated a preferred embodiment of the invention as it would be used in attaching a plurality of objects to a curved overhead surface. As best seen in FIG. 1 and FIG. 2, the apparatus comprises basically a fixture 10, a sheet of flexible material which is impervious to air 17 and any suitable means for temporarily supporting the fixture in a position adjacent to the overhead surface 12 such as a tripod 21 having a threaded extensible member 20 with a platform 19 attached thereon.

The fixture 10 in the preferred embodiment is manufactured from a flexible metal sheet so that it will conform to the contours of the overhead surface 12 but may be manufactured from any material or in any manner which will result in the required flexibility. It will be understood that for applications where the objects 11 are to be applied to a number of surfaces each having the same contour, the fixture 10 may be rigidly shaped to mate with the single contour of those surfaces. However, since using a rigid fixture may induce local load concentrations in the objects 11 a rigid fixture should not be used with objects which will crack easily.

Extending outward from the face of the fixture 10 are projections 13 which are arranged so as to border each object 11 thus defining the spacing and configuration of the objects. In the preferred embodiment shown in FIG. 1 these projections 13 are horizontal metal bars having a rectangular cross-section; however, the projections 13 may be manufactured from any suitable material which can be fastened to the fixture 10. Additionally, the projections 13 may take a number of different forms such as cylindrical or rectangular bars set on end. As shown in FIG. 2 the projections 13 will generally extend outward from the face of the fixture 10 a distance which is less than the thickness of the objects 11 to assure that the backs of the objects 11 will contact the overhead surface 12 without interference from the projections 13. The width of the projections defines the spacing between the objects 11 and may be varied to suit a variety of particular requirements such as providing an allowance for thermal expansion of the objects 11.

The fixture 10 is provided with a plurality of apertures 15 exposing the centers of and seams between the objects 11 so that the alinement and positioning of the objects 11 may be inspected through these apertures by sight and touch. However, if only visual inspection is required the fixture 10 may be manufactured from a transparent material.

The flexible material 17 may be manufactured from any material which is impervious to air and which has little rigidity such as vinyl plastic. The flexible material 17 is provided with a plurality of airtight fittings 18 of a kind generally known to one skilled in the art which are connected to a suction pump or other suitable means for drawing air through the fittings 18. The flexible material 17 is of such dimensions that an airtight seam 22 can be formed between the flexible material 17 and the surface 12 thereby forming an airtight cavity 23 around the fixture 10 and objects 11. The airtight seam 22 may be formed by any suitable means such as by applying zinc chromate putty between the surface 12 and the flexible material 17. The flexible material 17 may be transparent so that visual inspection of the alinement and positioning of the objects is not impaired. This is particularly important if the surface 12 is large and will be covered in segments, since making the flexible material 17 transparent allows the fixture 10 and objects 11 to be attached along a reference line without difficulty.

The platform 19 holds the flexible material 17, fixture 10 and objects 11 in place adjacent to the surface 12 until a vacuum is developed in the cavity 23 formed between the flexible material 17 and the surface 12. The platform 19 is preferably manufactured from a transparent material to facilitate visual positioning of the fixture 10, objects 11 and flexible material 17.

OPERATION

In use the flexible material 17 is layed on the platform 19 and the fixture 10 placed on top of the flexible material 17. The objects 11 are located on the fixture 10 in the predetermined configuration defined by the projections 13 with the outward face of the objects 11 facing the fixture 10. The tripod 21 is moved into position beneath the surface 12 and the threaded extensible member 20 is twisted so as to elevate the platform 19 until the objects 11 are adjacent to or just in contact with the surface 12 as shown in FIG. 2. This positioning process is simplified by having the platform 19, flexible material 17, and fixture 10 manufactured from transparent materials. In the preferred embodiment a pressure sensitive adhesive is applied to the overhead surface 12, but many other means of attached the objects 11 to the surface 12 will suggest themselves to one skilled in the art. For example, various types of known mechanical fasteners or a diffusion bonding process may be used.

The flexible material 17 is attached to the surface 12 by any suitable means which will form an airtight seam 22 between the surface 12 and the flexible material 17. The airtight fittings 18 are then connected to a suction pump 25 and the air is pumped from the cavity 23 formed around the fixture 10 and objects 11 by the flexible material 17 and the overhead surface 12. The suction pump lowers the air pressure in the cavity 23 and the higher air pressure outside the cavity presses the fixture 10 and objects 11 against the surface 12 and supports them in the desired position. The air pressure outside the cavity acts uniformly over the face of the fixture 10 forcing the fixture 10 to conform to the contours of the surface 12 thereby locating the objects 11 in the predetermined configuration on the overhead surface 12. The air pressure is evenly distributed over the faces of all the objects 11 without any local load concentrations; therefore; the objects 11 can be fragile ceramic tile or the like.

Once the vacuum is established in the cavity 23 the tripod 21 and the platform 19 are removed. The vacuum is maintained until the objects 11 have been attached to the surface 12, then the vacuum is broken and the flexible materal 17 and the fixture 10 are removed.

It will be understood that the foregoing description is of the preferred embodiments of the invention and is therefore merely representative. In order to appreciate more fully the spirit and scope of the invention reference should be made to the appended claims.

What is claimed as new and desired to be secured by Letters Patent of the United States is:

1. An apparatus for supporting and positioning a plurality of objects in a preselected configuration against a curved surface comprising:
   a fixture for supporting said objects while said objects are being attached to said curved surface; said fixture being flexible to allow said fixture to conform to said curved surface and said fixture having a plurality of projections extending outward from said fixture for locating and maintaining said objects in a predetermined orientation and spacing as said fixture and objects conform to said curved surface;
   uniform pressure means for applying a uniform pressure to said fixture and objects; said uniform pressure holding said fixture and objects against said curved surface while said objects are being attached to said curved surface; and
   positioning means for locating said fixture and objects adjacent to said surface prior to the application of said load means.

2. An apparatus as set forth in claim 1 wherein said fixture has a plurality of aperture means exposing the centers of and seams between said objects for inspecting the alinement and positioning of said objects by sight and touch.

3. An apparatus as set forth in claim 1 wherein said uniform pressure means for applying a uniform pressure is a vacuum means.

4. An apparatus as set forth in claim 3 wherein said vacuum means comprises a sheet of flexible material impervious to air, securing means for attaching said material to said surface forming an airtight cavity around said fixture and objects, and suction means for creating a vacuum within said airtight cavity.

5. An apparatus as set forth in claim 4 wherein said flexible material is transparent to aid in inspection of alinement and positioning of fixture and objects.

6. An apparatus as set forth in claim 1 wherein said positioning means comprises a base supporting an extensible member having a platform attached thereto.

* * * * *